(12) United States Patent
Suvi et al.

(10) Patent No.: US 8,130,635 B2
(45) Date of Patent: Mar. 6, 2012

(54) NETWORK ACCESS NODES

(75) Inventors: Mikael Suvi, Alliku (EE); Madis Kaal, Tallinn (EE); Karlheinz Wurm, Tallinn (EE)

(73) Assignee: Skype Limited, Dublin (IE)

( * ) Notice: Subject to any disclaimer, the term of this patent is extended or adjusted under 35 U.S.C. 154(b) by 365 days.

(21) Appl. No.: 12/584,998

(22) Filed: Sep. 15, 2009

(65) Prior Publication Data

US 2010/0290337 A1 Nov. 18, 2010

(30) Foreign Application Priority Data

May 18, 2009 (GB) .................................. 0908510.1

(51) Int. Cl.
*H04J 1/16* (2006.01)
(52) U.S. Cl. ........................................ 370/216; 370/389
(58) Field of Classification Search .................. 370/216, 370/217, 218, 248, 242, 351, 389
See application file for complete search history.

(56) References Cited

U.S. PATENT DOCUMENTS

| 7,969,956 B2* | 6/2011 | Borella et al. ................. 370/342 |
| 2005/0100029 A1 | 5/2005 | Das |
| 2005/0177515 A1 | 8/2005 | Kalavade et al. |
| 2007/0293232 A1 | 12/2007 | Nonaka |
| 2009/0296566 A1* | 12/2009 | Yasrebl et al. ................. 370/221 |

FOREIGN PATENT DOCUMENTS

| EP | 1 363 425 A2 | 11/2003 |
| EP | 2 207 378 A1 | 7/2010 |
| WO | WO 98/32262 | 7/1998 |
| WO | WO 2005/008524 | 1/2005 |
| WO | WO 2005/008524 A1 | 1/2005 |
| WO | WO 2005/009019 A2 | 1/2005 |
| WO | WO 2005/009019 A3 | 1/2005 |
| WO | WO 2010/057125 A1 | 5/2010 |

OTHER PUBLICATIONS

Notification of Transmittal of the International Search Report (ISR) and the Written Opinion (WO) of the International Searching Authority, or the Declaration with the ISR and WO, PCT/EP2010/056285, 11 pp., mailed Aug. 11, 2010.
Search Report, GB0908510.1, dated Sep. 13, 2010, 2 pp.

* cited by examiner

*Primary Examiner* — Brenda H Pham
(74) *Attorney, Agent, or Firm* — Hamilton, Brook, Smith & Reynolds, P.C.

(57) ABSTRACT

A communication system, method and program, the system comprising: one or more wireless access nodes of a first communication service provider and at least one server associated with a second communication service provider, interconnected via a packet-based network; and a wireless user terminal operable to establish a session with one of the wireless access nodes of the first communication service provider, the wireless user terminal is installed with an application of the second communication service provider. The application is configured so as to: in event of failure to establish a session via one of the wireless access nodes of the first communication service provider, store information regarding the failed session at the wireless user terminal; and in event of subsequent access to the packet-based network, transmit the information regarding the failed session to the server associated with the second communication service provider over the packet-based network.

46 Claims, 7 Drawing Sheets

NETWORK ACCESS NODES

RELATED APPLICATION

This application claims priority under 35 U.S.C. §119 or 365 to Great Britain Application No. 0908510.1, filed May 18, 2009. The entire teachings of the above application are incorporated herein by reference.

FIELD OF THE INVENTION

The present invention relates to accessing a packet-based network via wireless access points.

BACKGROUND

Some communication systems allow the user of a device, such as a personal computer, to communicate across a packet-based computer network such as the Internet. Such communication systems include voice over internet protocol ("VoIP") communication systems. These systems are beneficial to the user as they are often of significantly lower cost than conventional fixed line or mobile networks. This may particularly be the case for long-distance communication. To use a VoIP system, the user installs and executes client software on their device. The client software provides the VoIP connections as well as other functions such as registration and authentication. In addition to voice communication, the client may also provide further features such as video calling, instant messaging ("IM"), SMS messaging, file transfer and voicemail.

One type of communication system for packet-based communication uses a peer-to-peer ("P2P") topology. To enable access to a peer-to-peer system, a user must execute P2P client software provided by a P2P software provider on their terminal, and register with the P2P system. When the user registers with the P2P system, the client software is provided with a digital certificate from a server. Once the client software has been provided with the certificate, then calls or other communications can subsequently be set up and routed between users of the P2P system without the further use of a server in the set-up. Instead, the client looks up the required IP addresses from information distributed amongst the P2P client software on other end users' terminals within the P2P system. Once the IP address of a callee's terminal has thus been determined, the caller's P2P client software then exchanges certificates with the callee's P2P client software. The exchange of the digital certificates (or user identity certificates, "UIC") between users provides proof of the users' identities and that they are suitably authorised and authenticated in the P2P system. Therefore, the presentation of digital certificates provides trust in the identity of the users.

It is therefore a characteristic of peer-to-peer communication that, once registered, the users can set up their own communication routes through the P2P system in a decentralized manner based on distributed address look-up and the exchange of one or more digital certificates, without using a server for those purposes. Further details on such a P2P system are disclosed in WO 2005/008524 and WO 2005/009019.

VoIP or other packet-based communications can also be implemented using non-P2P systems that do use centralized call set-up.

A problem with packet-based communication systems is that a reliable connection with a sufficient bandwidth is required to the Internet or other packet-based network. Whilst this is generally not a problem when the user is at a known, fixed location (such as their home), establishing a connection can be problematic when the user is travelling and must access the packet-based network via a wireless access node of unknown quality. For example, wireless Internet hotspots, provided by wireless local area network ("WLAN") access points and appropriate hotspot software, are widely available for use by users when travelling. These are often available in public areas such as airports, cafes and stations, and are operated by a third-party service provider other than the provider of the client software. However, these hotspots are often not freely usable to anyone, and instead access to Internet is restricted and secured. The hotspots require the user to obtain login credentials from the hotspot operator, e.g. in return for payment.

For instance, a protocol such as the Wireless Internet Service Provider roaming ("WISPr") protocol can be used for accessing the hotspot. When the WISPr protocol is used, a user attempting to connect to the internet using a restricted-access hotspot is redirected to a login server of the operator of the hotspot. This redirection results in the display of a login page to the user. The login page prompts the user to either enter a username and password (for example if this has been purchased in advance by the user or provided as part of a pre-arranged billing arrangement) or enter credit card (or other payment) details. By entering the required information the user gains access to the hotspot and can connect to the Internet, and if required is charged accordingly. Alternatively, smart clients can be used that automate the login process based on the WISPr information contained in the login page. Smart clients may hide the complexity of login process from end user. For example, Skype Access is one such smart client.

SUMMARY

According to one aspect of the present invention, there is provided a communication system comprising: one or more wireless access nodes of a first communication service provider and at least one server associated with a second communication service provider, interconnected via a packet-based network; and a wireless user terminal operable to establish a session with one of the wireless access nodes of the first communication service provider, the wireless user terminal comprising a processor and a storage medium installed with an application of the second communication service provider, wherein said application is configured so as when executed on the processor to: in event of failure to establish a session via one of the wireless access nodes of the first communication service provider, store information regarding the failed session at the wireless user terminal; and in event of subsequent access to the packet-based network, transmit said information regarding the failed session to the server associated with the second communication service provider over the packet-based network.

Thus the second communication service provider is advantageously able to collect diagnostic data when its product experiences a failure relating to a wireless access point of a first communication service provider.

Preferably, the server may be arranged so as to enable a property of the communication system to be modified based on said information received at the server.

In further embodiments, the communication system may comprise a plurality of said access nodes.

Said server of the second communication service provider may be arranged to record an availability status for each of said wireless access nodes of the first communication service provider, the availability status indicating whether the respective access node is available to the client for setting up the communication connection.

Said server may be arranged to modify the status of the access node to indicate it is not available based on said information received at the server.

An access page may be made available to the user terminal from a server which is accessible even if access to packet-based network is not available.

The server may be arranged to modify the access page based on said information received at the server.

The server may be arranged to modify message routing information used by the access node to establish the session, based on said information received at the server.

The server may be arranged to modify, based on said information received at the server, a format of at least one of a username and password in a message sent from the access node requesting establishment of the session.

The server may be arranged to communicate information about the failure to an operator of the access node based on said information received at the server.

The user terminal may be arranged to initiate establishment of said session with the access node using a tunnelling protocol for bypassing restrictions of the access node.

The failure may be due to failure of the access node to recognise the tunnelling protocol.

The failure may be due to failure of the access node to respond with an expected response message according to a login protocol for establishing the session with the access node.

The failure may be due to failure of the server to respond or access node to relay an expected security token.

Said wireless access nodes may be WLAN access nodes. Said packet-based network may be the Internet. The communication system may be a peer-to-peer communication system.

Said application of the second communication service provider may be a communication-related application for use in setting-up a communication connection with another user equipment over the packet-based network.

The communication connection may be a bidirectional communication connection.

Said application may comprise a communication client of the second communication service provider, wherein the communication client is configured so as when executed on the processor to use said session to set up a communication connection with another user equipment over the packet-based network.

Said application may comprise an access-manager of the second communication service provider, wherein the access manager is configured so as when executed on the processor to enable a client application of a third communication service provider to use said session to set up a communication connection.

According to another aspect of the present invention, there is provided a method for use in a communication system comprising one or more wireless access nodes of a first com-munication service provider and at least one server associated with a second communication service provider, interconnected via a packet-based network, wherein the method comprises: attempting to establish a session between a wireless user terminal and one of the wireless access nodes of the first communication service provider, the wireless user terminal being installed with an application of the second communication service provider; and following failure to establish the session between the wireless user terminal and the wireless access node of the first communication service provider, and in event of subsequent access to the packet-based network by the wireless user terminal, receiving information regarding the failed session at said server over the packet-based network, the information having been stored at the wireless user terminal by said application in response to said failure.

According to another aspect of the invention, there is provided a method for use in a communication system comprising one or more wireless access nodes of a first communication service provider and at least one server associated with a second communication service provider, interconnected via a packet-based network, wherein the method comprises: operating a wireless user terminal to attempt to establish a session with one of the wireless access nodes of the first communication service provider, the wireless user terminal comprising a processor and a storage medium installed with an application of the second communication service provider; in event of failure to establish said session, using said application to store information regarding the failed session at the wireless user terminal; and in event of subsequent access to the packet-based network, using said application to transmit said information regarding the failed session to the server associated with the second communication service provider over the packet-based network.

A method according to the present invention may further comprise steps in accordance with any of the system features above.

According to another aspect of the present invention, there is provided a computer program product for use in relation to a communication system comprising one or more wireless access nodes of a first communication service provider and at least one server associated with a second communication service provider, interconnected via a packet-based network, wherein the program comprises code embodied on a computer-readable medium and configured so as when executed on a wireless user terminal to perform the steps of: operating the wireless user terminal to attempt to establish a session with one of the wireless access nodes of the first communication service provider; in event of failure to establish said session, store information regarding the failed session at the wireless user terminal; and in event of subsequent access to the packet-based network, transmit said information regarding the failed session to the server associated with the second communication service provider over the packet-based network.

The computer program product may be further configured in accordance with any relevant corresponding method step or system feature.

In other aspects of the present invention, there may also be provided a user equipment, wireless access node, and/or server in accordance with any relevant corresponding method step or system feature.

BRIEF DESCRIPTION OF THE DRAWINGS

For a better understanding of the present invention and to show how it may be carried into effect, reference will now be made by way of example to the accompanying drawings in which.

DETAILED DESCRIPTION OF PREFERRED EMBODIMENTS

In preferred embodiments, the present invention provides a method for retrieving data concerning the reliability of hotspots. The client is arranged to detect if the establishment of an Internet session via a hotspot has failed, and, in response to detecting failure, to collect and store locally hotspot related information. When the client detects that an Internet connection has subsequently been established, it then sends this information to a server of the client software provider. This information may be used to diagnose the problem remotely, and in some cases the hotspot status may be changed at the server to indicate that it is not supported.

This method will be discussed later in relation to FIG. 8, but first an example of a packet-based communication system using wireless access points will be discussed in relation to FIGS. 1-7.

Figure 1:
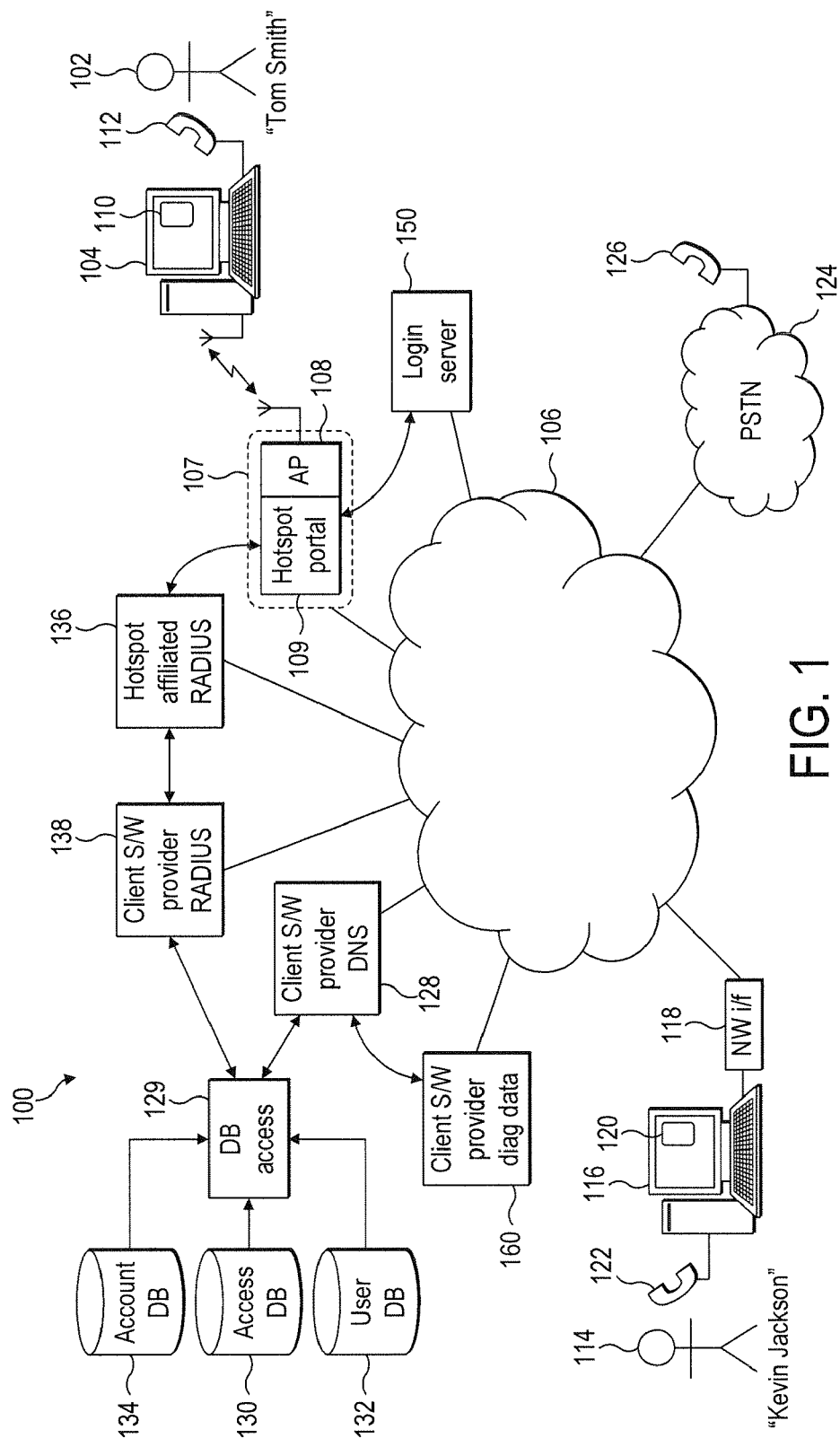
FIG. 1 is a schematic representation of a packet-based communication system.

Reference is first made to FIG. 1, which illustrates a packet-based communication system 100. It should be appreciated however that whilst this system and method is described with reference to a packet-based communication system, the same techniques could also be applied to provide access to hotspots for other applications. Note also that whilst this illustrative embodiment is described with reference to a P2P communication system, other types of communication system could also be used, such as non-P2P VoIP, IM or other communication systems.

A first user of the communication system (named "Tom Smith" 102) operates a user terminal 104 which is able to connect to a packet-based network 106 such as the Internet. The user terminal 104 may be, for example, a personal computer ("PC") (including, for example, Windows™, Mac OS™ and Linux™ PCs), a personal digital assistant ("PDA"), a mobile phone, a gaming device or other embedded device able to connect to the network 106. The user terminal 104 is arranged to receive information from and output information to the user 102 of the device. In a preferred embodiment of the invention the user device comprises a display such as a screen and an input device such as a keyboard, mouse, joystick and/or touch-screen.

In the example shown in FIG. 1, the user terminal 104 comprises a network interface that is able to connect to a WLAN access node 107. The access node comprises an access point ("AP") 108, which provides wireless connections to the access node 107, and a hotspot portal 109, which controls whether a user terminal is able to connect to the packed-based network 106 via the access node 107. The AP 108 and hotspot portal 109 can be co-located in a single entity, or be provided in distinct separate entities. However, regardless of the structural layout, the functionality of the two elements is the same, such that the hotspot portal 109 controls whether a user terminal is able to connect to the packet-based network 106 (e.g the Internet) via the access node 107. The hotspot portal 109 provides functionality such as redirection for authentication and payment. Also connected to access node 107, or co-located with it, is a login server 150 which provides web-pages for login or related to login, to which the user is redirected by the hotspot portal 109 upon beginning the login process. The login server 150 is preferably connected to the hotspot portal 109 by a connection other than via the packet-based network 106 so that it is available even access to the network is not, e.g. if internet is not available.

Further connected to the packet-based network 106, there is also provided a diagnostic data server 160 and a DNS backend server 128 of the client software provider. These will be discussed in more detail later. The diagnostic data server 160 may also be connected directly to a DNS server 128 via a connection other than via the packet-based network 106, e.g. other than via the Internet.

The user terminal 104 is running a communication client 110, provided by the software provider. The communication client 110 is a software program stored on a storage medium and executed on a local processor in the user terminal 104. The user terminal 104 is also connected to a handset 112, which comprises a speaker and microphone to enable the user to listen and speak in a voice call. The microphone and speaker does not necessarily have to be in the form of a traditional telephone handset, but can be in the form of a headphone or earphone with an integrated microphone, as a separate loudspeaker and microphone independently connected to the user terminal 104, or integrated into the user terminal 104 itself.

Figure 2:
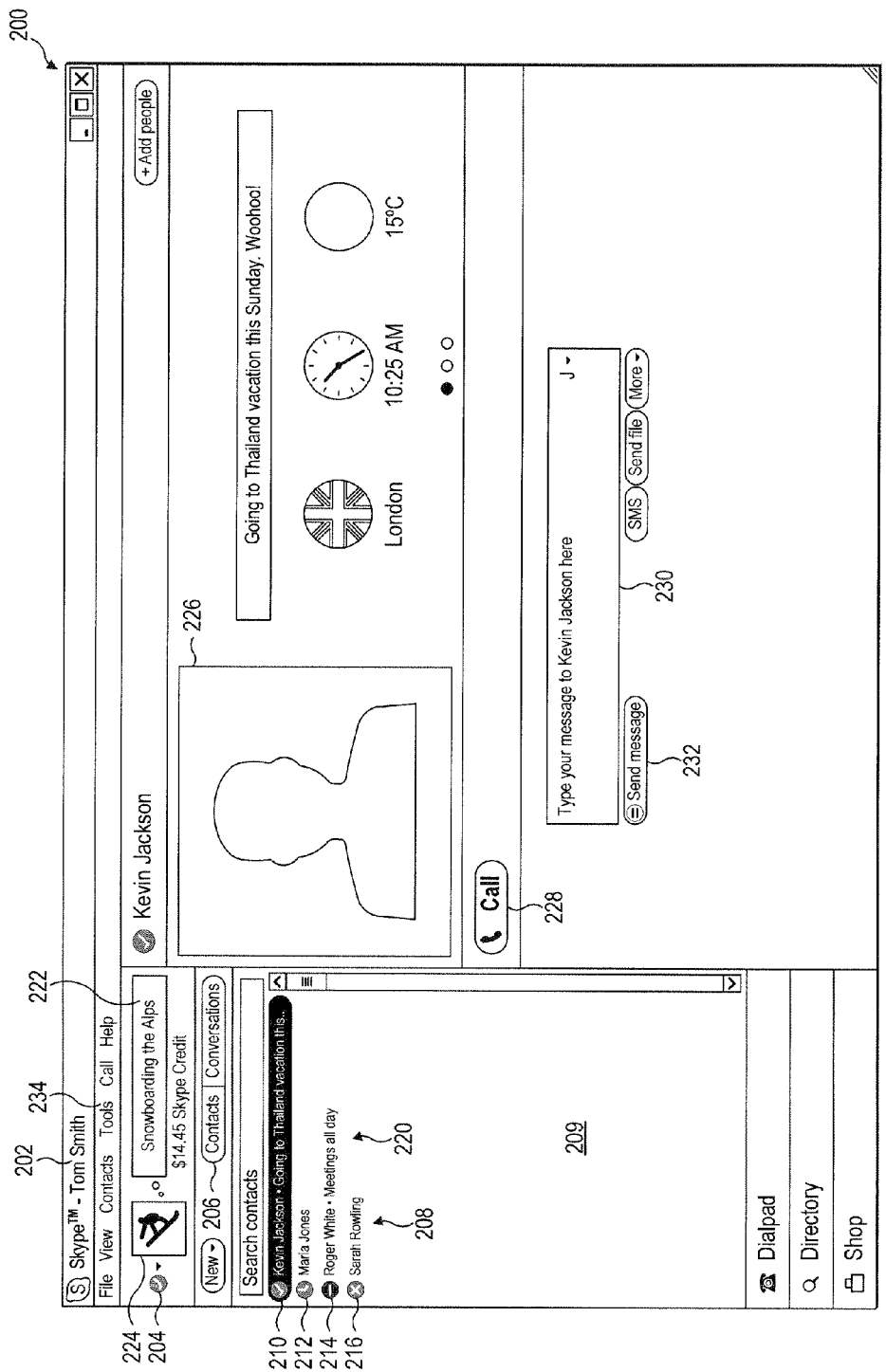
FIG. 2 is a schematic representation of a user interface of a communication client application.

An example of a user interface 200 of the communication client 110 executed on the user terminal 104 of the first user 102 is shown illustrated in FIG. 2. Note that the user interface 200 can be different depending on the type of user terminal 104. For example, the user interface can be smaller or display information differently on a mobile device, due to the small screen size. In the example of FIG. 2, the client user interface 200 displays the username 202 of "Tom Smith" 102 in the communication system, and the user can set his own presence state (that will be seen by other users) using a drop down list by selecting icon 204.

The client user interface 200 comprises a button 206 labelled "contacts", and when this button is selected the contacts stored by the user in a contact list are displayed in a pane 209 below the button 206. In the example user interface in FIG. 2, four contacts of other users of the communication system are shown listed in contact list 208. Each of these contacts have authorised the user 102 of the client 110 to view their contact details and presence state. Each contact in the contact list has a user-defined presence status icon associated with it. For example, the presence status icon for "Kevin Jackson" 210 indicates that this contact is "online", the presence icon for "Maria Jones" 212 indicates that this contact is "away", the presence icon for "Roger White" 214 indicates that this contact's state is "do not disturb" ("DND"), the presence icon for "Sarah Rowling" 216 indicates that this contact is "offline". Further presence state indications can also be included. Mood messages 220 of the contacts are shown displayed next to the names of the contacts in pane 209.

For example, presuming that the user 102 is able to gain access to the network 106 via the access node 107, VoIP calls to the users in the contact list may be initiated over the communication system by selecting the contact and clicking on a "call" button 228 using a pointing device such as a mouse. Referring again to FIG. 1, the call set-up is performed using proprietary protocols, and the route over the network 106 between the calling user and called user is determined by the peer-to-peer system without the use of servers. For example, the first user "Tom Smith" 102 can place a VoIP call to a second user "Kevin Jackson" 114.

Following authentication through the presentation of digital certificates (to prove that the users are genuine subscribers of the communication system—described in more detail in WO 2005/009019), the call can be made using VoIP. The client 110 performs the encoding and decoding of VoIP packets. VoIP packets from the user terminal 104 are transmitted into the network 106 via the access node 107, and routed to a computer terminal 116 of the called party 114, via a network interface 118. A client 120 (similar to the client 110) running on the user terminal 116 of the called user 114 decodes the VoIP packets to produce an audio signal that can be heard by the called user using the handset 122. Conversely, when the second user 114 talks into handset 122, the client 120 executed on user terminal 116 encodes the audio signals into VoIP packets and transmits them across the network 106 to the user terminal 104. The client 110 executed on user terminal 104 decodes the VoIP packets, and produces an audio signal that can be heard by the user of the handset 112, or use other forms of communication such as instant messaging, video calls or transferring files.

The VoIP packets for calls between users (such as 102 and 114) as described above are passed across the network 106 only, and the public switched telephone network ("PSTN") 124 is not involved. Furthermore, due to the P2P nature of the system, the actual voice calls between users of the communication system can be set up with no central servers being used. This has the advantages that the network scales easily and maintains a high voice quality, and the call can be made free to the users. Additionally, calls can also be made from the client (110, 122) using the packet-based communication system to fixed-line or mobile telephones 126, by routing the call to the PSTN network 124. Similarly, calls from fixed-line or mobile telephones 126 can be made to the packet-based communication system via the PSTN 124.

In addition to making voice calls, the user of the client 110 can also communicate with the users listed in the contact list 208 in several other ways. For example, an instant message (also known as a chat message) can be sent by typing a message in box 230 (as shown in FIG. 2) and sending it by selecting the "send message" button 232. Additionally, the first user 102 can use the client 110 to transfer files to users in the contact list 208, send voicemails to the contacts or establish video calls with the contacts (not illustrated in FIG. 2).

Figure 3:
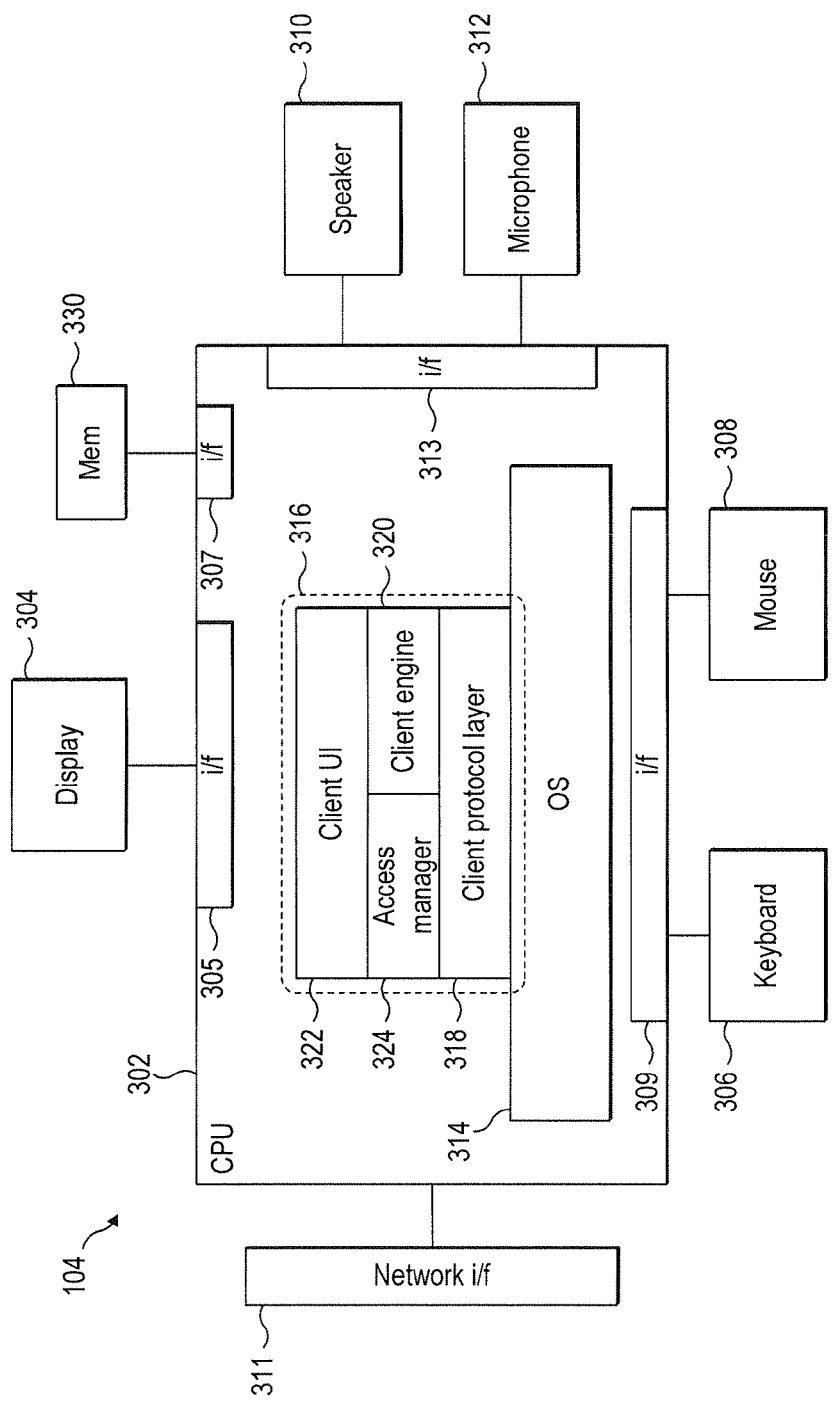
FIG. 3 is a schematic block diagram of a user terminal executing a communication client application.

FIG. 3 illustrates a detailed view of the user terminal 104 on which is executed client 110. The user terminal 104 comprises a central processing unit ("CPU") 302 to which is connected: a memory 330 such as a flash memory and/or hard-drive connected via a memory controller interface 307. The memory 330 is installed with the communication client 110, i.e. stores the client 110 in a location in which it is made available for execution on the CPU 302. The CPU 302 is also connected to a display 304 such as a screen via a display interface 305, an input device such as a keyboard 306 and a pointing device such as a mouse 308 connected via an interface 309 such as USB. In alternative terminals, the input devices and pointing device can be integrated into the terminal, such as a keypad, touch-screen and/or joystick. An output audio device 310 (e.g. a speaker) and an input audio device 312 (e.g. a microphone) are connected via an audio interface 313. The output audio device 310 and input audio device 312 may be integrated into a handset 112 or headset, or may be separate. The CPU 302 is connected to a network interface 311 for connecting to a WLAN AP.

FIG. 3 also illustrates an operating system ("OS") 314 executed on the CPU 302. Running on top of the OS 314 is a software stack 316 for the client 110. The software stack shows a protocol layer 318, a client engine layer 320 and a client user interface layer ("UI") 322. Each layer is responsible for specific functions. Because each layer usually communicates with two other layers, they are regarded as being arranged in a stack as shown in FIG. 3. The operating system 314 manages the hardware resources of the computer and handles data being transmitted to and from the network via the network interface 108. The client protocol layer 318 of the client software communicates with the operating system 314 and manages the connections over the communication system.

Processes requiring higher level processing are passed to the client engine layer 320. The client engine 320 also communicates with the client user interface layer 322. The client engine 320 may be arranged to control the client user interface layer 322 to present information to the user via the user interface of the client (as shown in FIG. 2) and to receive information from the user via the user interface.

Also shown integrated into the client 110 is an access manager 324. The access manager 324 is responsible for managing access to WLAN hotspots, as will be described in more detail hereinafter. In preferred embodiments, the access manager 324 is integrated into the client 110, and utilises the client UI layer 322 to display information to the users, and the client protocol layer 318 to connect to the communication system. In alternative embodiments, the access manager 324 can be implemented as standalone software executed on the OS 314, but which is in communication with the client 110.

As mentioned above, the access node 107 may provide only restricted access to the network 106, and the user may not possess the required credentials to enable access. Without access to the network 106, the user 102 is unable to use the communication client 110 to make calls (or send IM messages, etc.) over the network 106 (for example to user 114, as described above).

The system and method described below enables the user to gain access to the hotspot 109 without supplying sensitive personal information to the hotspot service provider, whilst using payment credits purchased from the communication client software provider. These two service providers are separate providers running independently operable systems (the client can also set up connections via other means than the wireless access nodes such as via a wired modem, and the wireless access nodes may be used for other purposes than setting up connections from the client such as for web browsing and email).

Nonetheless, the providers may be in partnership for the purpose of the payment, preferably vicariously via a payment partner as discussed in more detail below.

Figure 4A:
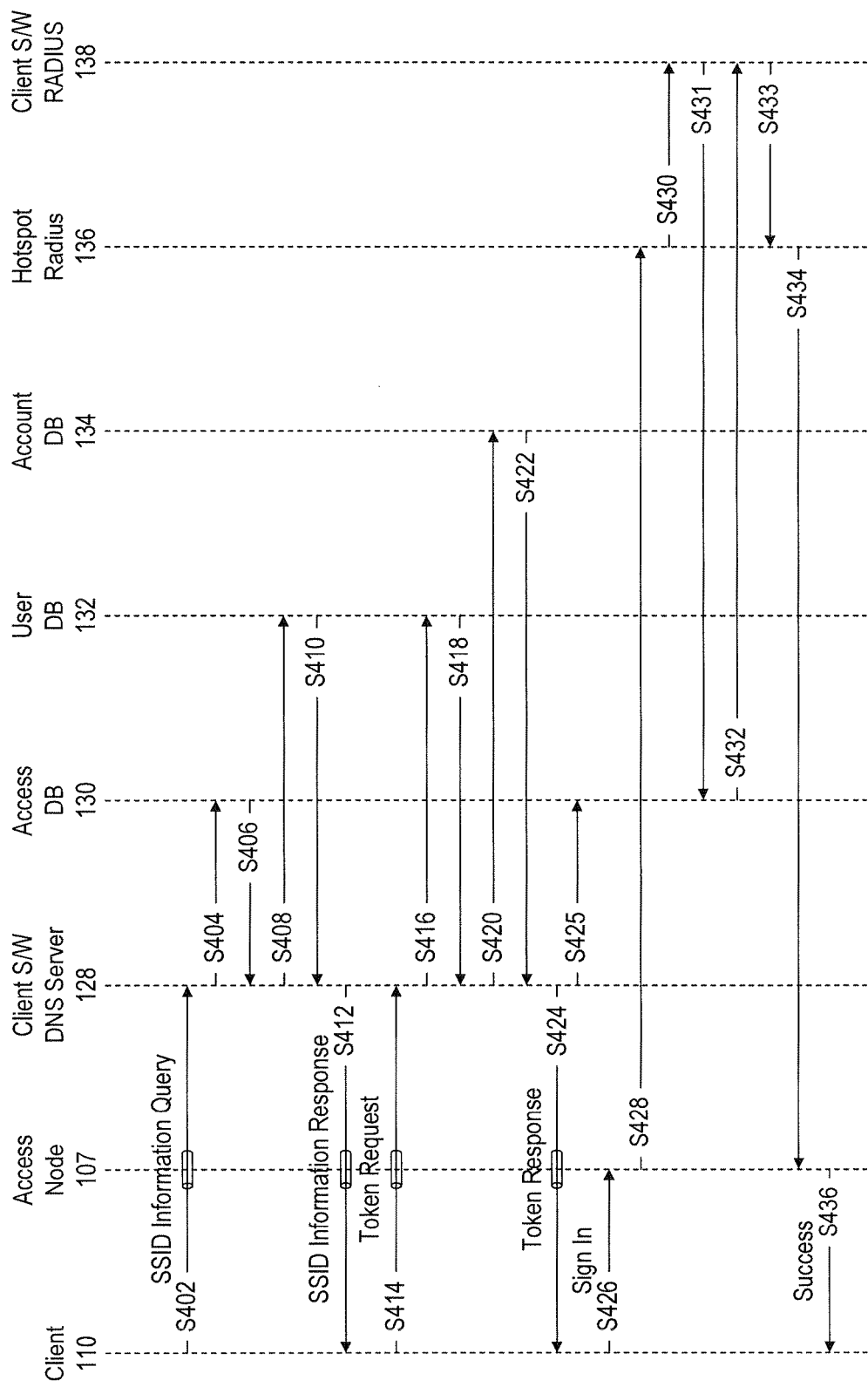
FIG. 4A shows a signalling chart for the process of logging into a WLAN hotspot.

Reference is now made to FIG. 1 and FIG. 4A, which describes the process for connecting to the restricted access node 107. As a first step (not shown in FIG. 4A), the operating system 314 of the device on which the client is installed scans for available wireless networks. The operating system can automatically connect to a remembered access point or prompt the user to select an access point. The operation of the scanning performed by the OS 314 depends on the user terminal 104 in use, and the OS that it is running.

The access manager 324 (in FIG. 3) detects changes occurring at the network interface 311. This can be achieved either by the access manager 324 being notified of a network interface event or by periodic polling by the access manager. The mechanism used for this depends on the user terminal 104 in question.

When a change in network interface is detected the access manager 324 reads the service set identifier ("SSID") of the AP 108 found by the OS 314 scan. Responsive to this, the access manager 324 generates an SSID information query. This query is used to discover whether it is possible for the access manager to log in to the hotspot 109 in question, and pay for access using pre-existing payment credits. To do this, the access manager 324 needs to send the SSID information query over the network 106 to a server holding a database of acceptable SSIDs. However, general access to the network 106 is restricted by the hotspot 109. In alternative embodiments, a database of acceptable SSIDs could be kept at the user terminal, but this is more difficult to manage.

To circumvent this restriction to access to the network 106, the SSID information query is encoded as a DNS query that is sent to a communication client software provider domain name server ("DNS", may also be referred to as the "back-end" server) 128 (in FIG. 1) over the network 106 via a DNS portal of the AP 108. The DNS protocol is used to bypass access restrictions of the hotspot 109 using a technique known as DNS tunnelling.

Note that the communication client software provider domain name server ("DNS") 128 is not necessarily an actual domain name server, but can be a specially configured server that is arranged to communication using the DNS protocol.

This is achieved by using a. Canonical name ("CNAME") record DNS query where the canonical names actually contain encrypted payload of the communication client's protocol. Both the query and response format must comply with strict rules. The total length of a fully qualified domain name ("FDQN") cannot exceed 255 bytes when represented in internal format that intermixes labels of up to 63 characters with length bytes. Using maximum length labels, there are 250 characters for carrying a payload. Base32 encoding can be used with the dictionary abcdefghjklmnopqrstuvwxyz0123456. Each character can carry 5 bits of binary payload, which means that each response and query can carry 1248 bits. An 1152 bit Rivest Shamir Adleman ("RSA") key is used for encryption. The readable form of query would be in a similar form to "data.data.data.access.skype.com".

The SSID information query sent from access manager 324 to the communication client software provider DNS server 128, comprises the SSID identifying the wireless LAN AP 108, a media access control ("MAC") address (identifying the physical network interface of the AP 108) and optionally the username of the user 102 logged into the client 110.

More specifically, the payload of the SSID information query comprises the following data:
  command—1 byte, indicates that the payload is a SSID Information Request
  cmdid—1 byte, client-assigned command ID. The DNS server will then send it back in responses to allow matching commands and responses
  username—32 bytes, string, may be non-zero-terminated if username is exactly 32 bytes long
  access point SSID—32 bytes, string, may be non-zero-terminated if SSID is exactly 32 bytes long
  access point MAC—6 bytes, binary, all zeroes if not available
  random client challenge—16 bytes, binary
  username hash for usernames longer than 32 characters, binary—20 bytes (SHA1) (this is meaningful only if username is not terminated with zero)

The command portion of the payload is sent unencrypted. The remaining payload is RSA encrypted for security. The payload is then base32 encoded, the result is then broken down into separate labels, with a domain name for which the packet-based communication system provider runs a DNS service added, for example ".access.skype.com".

The access manager 324 in the client 110 makes a recursive CNAME DNS query. This is shown as step S402 in FIG. 4A. As stated, because this is a DNS query (using DNS tunnelling), the message is forwarded by hotspot portal DNS server even though the hotspot 109 restricts access to the network 106.

On receipt of the SSID query the communication client software provider DNS server 128 extracts the binary payload by concatenating all labels and leaving out any characters that are not in the dictionary, at which point the base32 encoding is removed, resulting in a binary payload. The binary payload is then RSA decrypted.

The communication client software provider DNS server 128 determines if an agreement exists between the hotspot 109 operator and a payment partner (i.e. a trusted partner with whom a billing arrangement exists). This is determined by querying an access database 130 with the SSID in step S404. A response is received from the access DB 130 in step S406. Pricing information for this hotspot 109 is also retrieved in step S406. The location of the user (set in the user's profile information) can optionally be determined by querying a user database 132 with the username in step S408 and receiving the response in step S410. Using this data, pricing information may be given in the user's local currency.

Note that the databases in FIG. 1 are accessed via an optional DB access node 129.

If the SSID information query does not include the MAC address then the DNS server 128 just looks up the SSID, ignoring the MAC. If the query specifies a certain MAC, then server attempts to find a match. If a match is not found, then server zeroes out MAC address in response, and responds with generic SSID information.

The communication client software provider DNS server 128 generates an SSID response, encoded as a DNS response. If it is determined that the user 102 can pay for access to the internet via the AP 108 using their credit (as purchased for use in the packet-based communication system), the SSID response will indicate that the client 110 can pay for accessing the hotspot using the access manager 324. In particular the SSID response can include pricing information for the hotspot 109 in the user's local currency.

The SSID information response payload generated by the communication client software provider DNS server comprises:
  cmdid—1 byte, command ID of SSID request command that this response corresponds to
  access point SSID—32 bytes, string, may be non-zero-terminated if SSID is exactly 32 bytes long
  access point MAC—6 bytes, binary, all zeroes if not available
  price—4 bytes, big endian unsigned integer
  price_precision—4 bytes, price decimal precision, big endinan unsigned integer
  currency—4 bytes, zero terminated 3-letter currency code
  provider ID—2 bytes, big-endian integer The communication client software provider DNS server 128 encrypts the SSID information response using an encryption key derived from the 'client challenge' provided in the query. After encryption the payload is base32 encoded.

The SSID information response is sent to the client 110 in step S412 using DNS tunnelling.

In response to receiving a positive response to the SSID information query, the access manager 324 is arranged to generate a token request and to transmit the token request using the DNS protocol (tunnelling) to the communication client software provider DNS server 128 in step S414.

The payload of the token request message comprises:
  command—1 byte
  cmdid—1 byte, client-assigned command ID.
  username—32 bytes, string, may be non-zero-terminated if username is exactly 32 bytes long
  access point SSID—32 bytes, string, may be non-zero-terminated if SSID is exactly 32 bytes long password hash—16 bytes (MD5), binary
random client challenge—16 bytes, binary
username hash for usernames longer than 32 characters, binary—20 bytes (SHA1) (this is meaningful only if username is not terminated with zero)

The 1-byte command is sent unencrypted, the remaining total payload of 117 bytes is RSA encrypted. The password hash is a username/password hash where additionally first 16 bytes of public RSA key are hashed in. This makes the hash usable only while the RSA key that has been used to encrypt the packet, invalidating all previously sent hash values when the RSA key is invalidated.

The resulting 1160 bits are then base32 encoded, the result broken down into separate labels, and a domain name for which the packet-based communication system provider runs a DNS service added, for example ".access.skype.com". The client 110 then makes a recursive CNAME query in IN class to the communication client software provider DNS server 128 in step S414. As each query is different, each reaches the DNS server that gives authoritative answers for a specified domain.

The 'client challenge' is used for generating a key for encrypting the response packets, and also for generating a sessionID value from the token (described below). For example, the RC4-drop (768) symmetric encryption algorithm can be used, although any symmetric cipher in stream mode can also be used.

In response to receiving the token request the communication client software provider DNS server is arranged to decrypt the token request and to extract the user credentials client S/W providers system. In step S416 and S418, the DNS server verifies the username and password against credentials listed in the user database 132. In step S420, the user's credit balance is requested from an account DB 134, and a response received in S422, to ensure that the user has sufficient credit to pay for the hotspot 109 access.

If the user is verified and has sufficient credit, then the communication client software provider DNS server 128 will generate a random 16-byte token and respond to the client 110 with a base32-encoded response.

The payload of the token response message comprises:
command—1 byte
rc4 initialization vector—4 bytes, binary value
result code—1 byte
cmdid—1 byte, command ID of token request command that this response corresponds to
token—8 bytes
tick server addresses—8 bytes, preferably two IP addresses of where to send ticks to (described below)
login name format specifier—up to 83 bytes.

The entire payload starting from result code is encrypted using a key generated from the client challenge. After encryption the payload is base32 encoded. The token response message is then sent to the client 110 in step S424 using DNS tunnelling. The client 110 then decodes and then decrypts the response.

The communication client software provider DNS server 128 also stores the token that it generated with the username and the client challenge in the access DB 130 in step S425. The communication client software provider DNS server 128 also generates a temporary username from the token (as described below) and stores this as a session ID. The token, if unused, will expire from the server after a predetermined time.

In response to receiving the token and format specifier in step S424, the access manager 324 decodes and decrypts the response. The access manager 324 then preferably controls the client UI 322 to provide the user with the option to pay for connection using their packet-based communication system credit. An example user interface message is shown illustrated in FIG. 5. The user 102 can choose to connect to the AP 108 by selecting the "start" button 502, or choose not to connect by selecting the "cancel" button.

In response to receiving a selection signal from the user indicating that the user wishes to connect to the AP 108, the access manager can sign in to the hotspot 109 in step S426 using a temporary username and password, derived from the token and user credentials.

The temporary username is formatted according to the format specifier included in the token response. The format of the temporary username allows the hotspot 109 provider to determine the identity of the billing partner, and take appropriate message routing decisions.

The client 110 signs into the hotspot 109 in accordance with the WISPr recommendations. The access manager 324 attempts to send an http request via the AP 108, for retrieving a predetermined file of known content. The hotspot 109 redirects the request to the hotspot provider's login server (not shown). In response to being redirected to the login server, the access manager 324 is arranged to provide the temporary username and password to sign into the login server.

The hotspot 109 determines from the format of the temporary username (e.g. it has prefix indicating the billing partner) that the login request is associated with the packet-based communication system billing partner and forwards the billing request to the hotspot's Remote Authentication Dial In User Service ("RADIUS") server 136 in step S428.

In response to receiving the login request at the hotspot RADIUS server 136, the hotspot RADIUS server 136 determines from the format of the temporary user name that the login request is associated with the packet-based communication network. The hotspot RADIUS server 136 sends an authorisation query comprising the temporary username and password to the communication client software provider RADIUS server 138 in step S430.

The communication client software provider RADIUS server 138 receives the temporary username and password. Once the communication client software provider RADIUS server 138 has verified the credentials stored in the access DB 130 in steps S431 and S432, it responds to the hotspot RADIUS server 136 in step S433 with an "access accept" or "access reject" message. The "access accept" message identifies the session using the temporary username and can define the length of allowed session time calculated from the minimum of 30 min or the credit divided by the cost per minute.

Assuming an "access accept" message was received, the hotspot RADIUS server 136 transmits an authorisation message to the hotspot 109 in step S434. In response to receiving the authorisation message, the hotspot 109 allows the client 110 to access the internet, and informs client 110 that login was successful in step S436.

Figure 6:
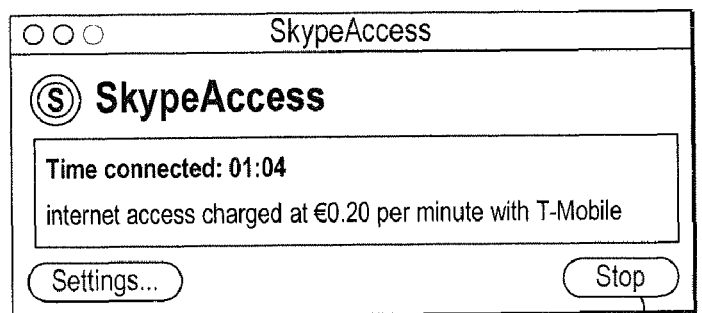
FIG. 6 shows a message displayed to a user during connection to a WLAN hotspot.

The access manager 324 informs (other elements of) the client 110 that login was successful. During the connection with the AP 108, the access manager 324 controls the client 322 UI to inform the user that the terminal is connected to the network as shown in FIG. 6. The user 102 can select to terminate the connection by selecting the "stop" button 602, as described hereinafter.

Figure 4B:
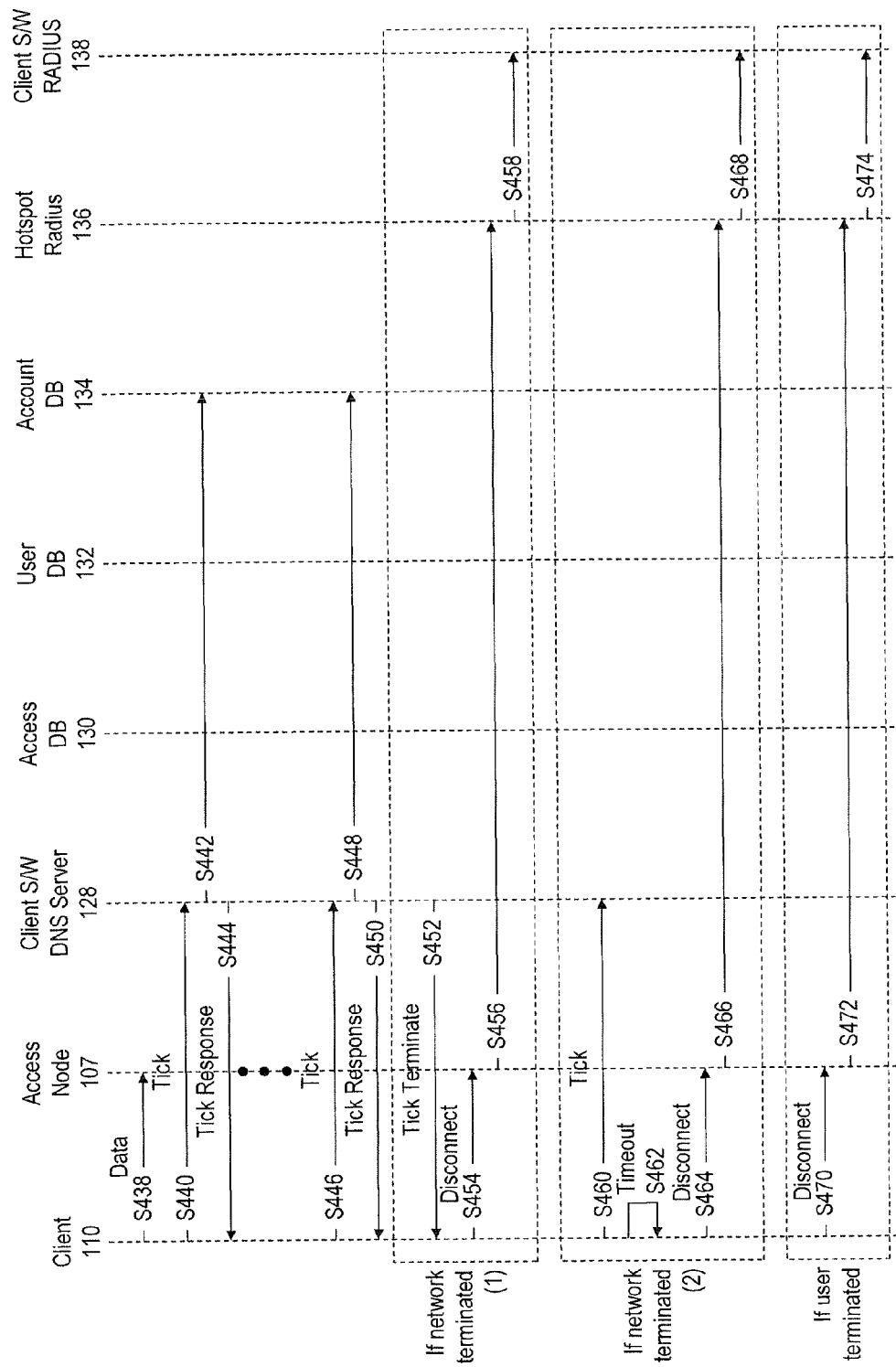
FIG. 4B shows a signalling chart for the process of sending data and terminating a connection to a WLAN hotspot.
Figure 5:
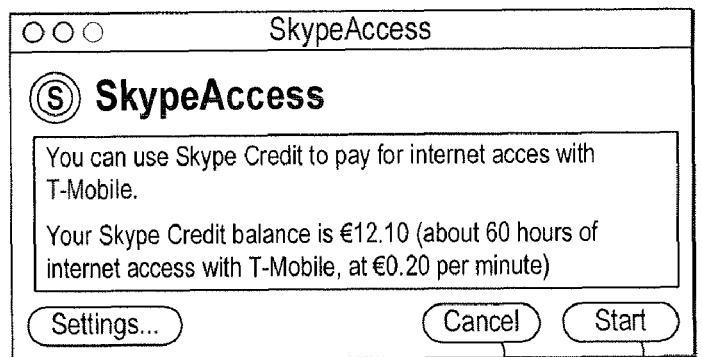
FIG. 5 shows a message displayed to a user before connecting to a WLAN hotspot.

Reference is now made to FIG. 4B, which illustrates the process during an ongoing connection to the AP 108, and when the connection is terminated.

In step S438, data is transmitted by the client 110 over the network 106 via the AP 108. This data can be in the form of a VoIP call or IM message to user 114, for example.

However, as mentioned above, the hotspot 109 that controls access to the internet is not controlled by the packet-based communication software provider. Therefore, it is problematic for the packet-based communication software provider to terminate the hotspot 109 session from the network side. This problem is solved by transmitting periodic messages or "ticks" from the client 110 and sending responses from the communication client software provider DNS server 128 to the client 110. The client 110 is configured to terminate the hotspot 109 session when indicated by the tick responses from the communication client software provider DNS server 128.

During the connection to the AP 108 the access manager 324 generates tick messages at predetermined time intervals (e.g. every 30 seconds). These ticks are sent to the communication client software provider DNS server 128 identified in the token response (see payload description above) in step S440. The information derived from the ticks for each session are stored in the account database 134 in step S442 so that they can be matched offline to the charges received from the billing partner.

In one embodiment of the invention access manager 324 may be arranged to send ticks alternately between two DNS servers identified in the token response to increase reliability.

The payload of the tick message comprises:
command indicating that the packet is a tick
temporary username
tick sequence number—4 bytes, big-endian unsigned integer
sequence_hash—16 bytes, MD5hash(client_challenge,sequence)

The ticks generated at the client 110 include a sequence number that is initialized to a nonzero random value and then increased every time a tick is sent. The communication client software provider DNS server 128 initializes a sequence number to 0. When a tick is received, the communication client software provider DNS server 128 calculates an MD5 hash on its own to verify that the seqence_hash matches the sequence number and the client_ challenge for the session. It then checks the sequence number against last successfully received sequence number. If the sequence number is smaller than the server-stored value (i.e. the tick arrived later than the tick that was sent after it) then the server does not update its counter. If the sequence number is bigger than one that server has stored then server does update its counter. The total number of ticks received for each session may be stored such that charges received from the billing partner may be reconciled.

In step S444, the communication client software provider DNS server 128 is arranged to generate a response to the tick received from the client 110. If the sequence number is smaller than server-stored value (i.e. the tick arrived later than tick that was sent after it) then the communication client software provider DNS server 128 responds to client with a RESULT_TICKIGNORED result code. If the sequence number is bigger than the one that the communication client software provider DNS server 128 has stored then the communication client software provider DNS server 128 responds with a RESULT_TICKACCEPTED code.

Further ticks, stores in the account DB 134, and tick responses are shown in S446, S448 and S450, respectively.

The periodic sending of ticks and receipt of responses continues during the length of the session with the AP 108.

The termination of the session with the AP 108 can occur due to either the network side or the client 110 terminating the connection. A network-side termination can occur in one of two ways, as described below.

A network-side termination can be required for the following reason. The communication client software provider DNS server 128 can determine that the user has less credit than determined at the beginning of the session (e.g. in S420). For example if the user of the client 110 has placed a charged VoIP call during the session (or depleted his credit in another way). In this case the communication client software provider DNS server 128 (or other server that generates the tick responses) can end the session in the following two ways.

In the first method, a RESULT_TERMINATE message is sent as a response to a tick from the communication client software provider DNS server 128 to the access manager 324 in step S452. In response to receiving the RESULT_TERMINATE message the access manager 324 is arranged to logout from the hotspot 109 and disconnect from the AP 108 in step S454. The hotspot 109 then generates an accounting stop message and closes access to the internet. The accounting stop message is sent to the hotspot RADIUS server 136 in S456. The charges accrued for the session are then sent to the communication client software provider RADIUS server 138 in S458 for payment offline.

In the second method, the communication client software provider DNS server(s) 128 are arranged to stop sending tick responses to the client 110 when the connection is to be terminated. In this case the client 110 sends a tick message in S460, and waits for a response. If a response is not received after a predetermined time interval in S462, then the client 110 is arranged to logout from the hotspot 109 and disconnect from the AP 108 in step S464. The hotspot 109 then generates an accounting stop message and closes access to the internet. The accounting stop message is sent to the hotspot RADIUS server 136 in S466. The charges accrued for the session are then sent to the communication client software provider RADIUS server 138 in S468 for payment offline.

The termination of the session by the client is now described with reference to steps S470 to S474.

As mentioned, the user 102 can terminate the session by selecting the "stop" button 602 in FIG. 6. Other methods for terminating the session are also possible, such as using OS controls. When the user 102 terminates the session the access manager 324 is arranged to generate a disconnect instruction. The disconnect instruction is sent to the hotspot 109 in S470. On receipt of the disconnect instruction the hotspot 109 terminates the access to the internet. The hotspot 109 sends an accounting stop message in S472 to the hotspot RADIUS server 136. The hotspot RADIUS server 136 determines the cost of the session. The charges accrued for the session are then sent to the communication client software provider RADIUS server 138 in S468 for payment offline.

Figure 7:
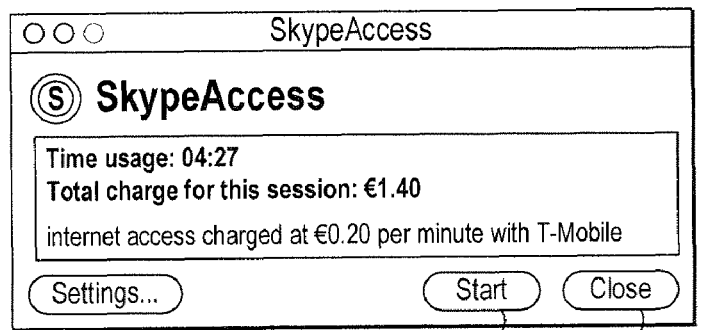
FIG. 7 shows a message displayed to a user upon disconnection from a WLAN hotspot.

Upon termination of the session with the AP 108 (by whatever method), the client 110 is arranged to control the UI to display a session end message, as shown in FIG. 7. The user can close the message by selecting the "close" button 702, or reconnect to the AP 108 using the "start" button 704.

Advantageously, the ticks received at the communication client software provider DNS server 128 from the client 110 are used to reconcile payment with hotspot operator, as an independent record of the length of time that a user was connected to the AP 108 can be generated.

In preferred embodiments, the password and username of the user currently logged into the client 110 are stored locally, to automatically allow the start of a new session when the current one ends because the maximum session duration has been exceeded.

The above describes how a communication connection with another user terminal 114 can be set up and kept alive via a wireless access node 107 to a packet-based network 106. However, there are a number of stages at which establishment of the session with the access point 108 could fail. For example, the access point 108 could fail to recognise the DNS tunnelling protocol (or other protocol for bypassing the access point's restrictions) or refuse to forward DNS queries. The responses from DNS server 128 could fail to reach the client 110. The failure could be due to failure of the server to respond or access node to relay an expected security token or, even if a valid token is provided, the login process may still fail for other reasons at login server 150, or because of incorrect message routing information. Although the above is only an example, other access architectures are likely to encounter one or more similar problems or indeed other problems not mentioned explicitly herein.

As mentioned, in preferred embodiments the client 110 detects when a session with an access node 107 has failed to be established and stores information relating to the failed session. When access to the Internet is subsequently available, the user terminal transmits the diagnostic data to a server of the client software provider, preferably to a diagnostics data server 160 of the client software provider. In particularly preferred embodiments, the client S/W provider may make some modification or reconfiguration of the system based on the diagnostic data.

Figure 8:
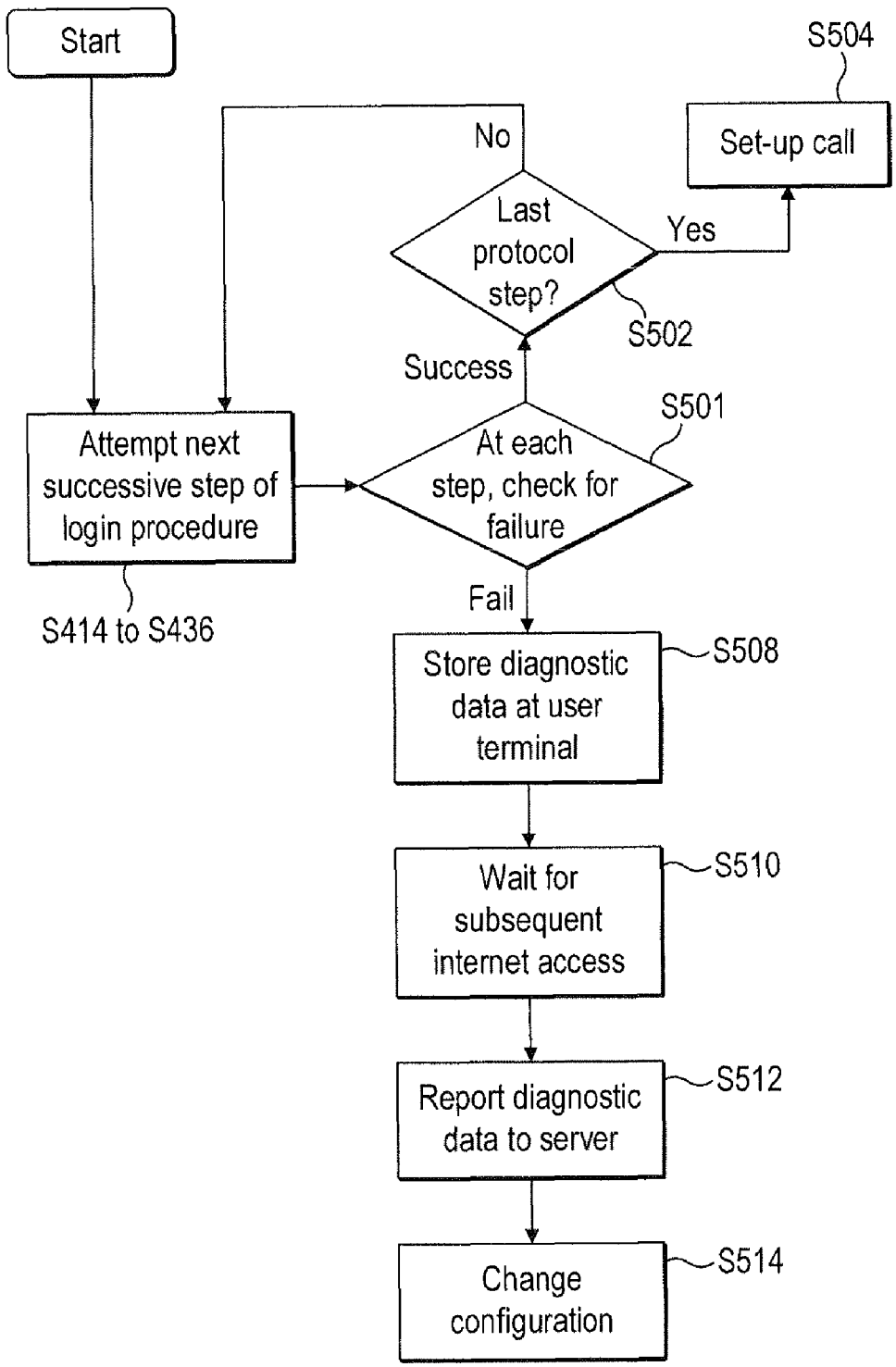
FIG. 8 shows a flow chart of a diagnostic method.

An example of the method which the client 110 may be configured to perform when executed is now discussed in relation to the flow chart of FIG. 8.

At each of one or more of the protocol steps above, the client 110 performs a respective checking step S501 to determine whether the access was successful. If successful, the client 110 proceeds to the next protocol step until it reaches the last protocol step at S502 meaning the session with the access node 107 has been successfully established and the client 110 can use the session to set up a call or other communication with another user 114. The ongoing session may involve for example the sub-steps of FIG. 4B.

However, in case of any step ending in failure then at step S508 the client 110 collects diagnostic data and stores it for later delivery, preferably in a non-volatile storage medium 330 such as a flash memory or hard-drive (not necessarily the same storage location as stores the code of the client software 110, although it could be). Note that by the term "diagnostic" data it may only be meant data for use in a later diagnosis of the problem, rather than data resulting from a diagnosis performed by the user terminal 104 or client 110 (although that possibility is not excluded). For example, the diagnostic data collected may comprise one or more of the following in any combination: (i) one or more HTML pages served to the user terminal 104 from a login server 150 via the hotspot 109 as a login page or in relation to the login, (ii) the SSID of the wireless access point 108, (iii) an address of the wireless access point such as its MAC and/or IP address, (iv) an address of the user terminal 104 such as its MAC and/or IP address, (v) an address of any associated network access gateways again such as MAC and/or IP address, and (vi) any responses received back at the user terminal 104 from the hotspot 109 in response to the queries sent over DNS, HTTP or HTTPS protocols. Additional diagnostic data may also comprise a date, time, and username of the user 102 to allow the collected data to be matched to server-side logs later. However, in principle any data relating to the failed establishment of the session with the access node 107 may be collected. The combination of data collected may depend on what step the failure occurred at.

At step 510, the client waits to detect subsequent availability of Internet access (or potentially other connection allowing the diagnostic data server 160 to be contacted). This could for example be either by means of another access node 107 or other means such as a wired modem connection (not shown). If another access node or wired modem connection is immediately available, this step S510 could occur immediately after the step S508 of storing the diagnostic data.

At step 512, once the subsequent Internet access has been detected, the user terminal 110 uploads the collected diagnostic data from its memory 330 to the diagnostic data server 160 via the Internet 106.

This diagnostic data could be used by a human operator to diagnose the problem and take steps to address it. For example, the login-related HTML pages collected from hotspot 109 may include information for users describing how the hotspot should be used. In some cases this information may not be directly written into the page but instead may be dynamically determined using code embedded in an HTML page, e.g. using JavaScript code. In another example, hotspot roaming with multiple aggregators often allows a user to choose a preferred aggregator at the login page. In that case, code in the login page such as JavaScript code will add routing information to the user-supplied username and password as part of the login procedure, based on the chosen aggregator. The routing information supplied in this way may be specific to the aggregator. The code may also format the username and/or password based on the chosen aggregator. By analysing HTML content and embedded Javascript code in the returned diagnostic data, it may be possible for the backend server 128 to determine the actual login name format, password format and/or routing information that works for that aggregator and communicate it back to the hotspot 109. Based on the analysis of the HTML page content, human operator may modify the configuration of some aspect of the communication system 100.

However, alternatively or additionally, at an optional step S514 one or more of the client software provider's servers may take steps, e.g. the diagnostic data server 160 may be arranged to interact with the backend server 128 (i.e. DNS server) in order to modify the configuration of some aspect of the communication system 100.

In one example, preferably used if the problem cannot be solved by any other adjustment such as those described above, then server-side records maintained at the backend server 128 may be changed to indicate the hotspot 109 is not available, and thus disable client support for the problematic hotspot. This will reduce customer complaints. The collected information may also be sent to the hotspot service provider for reference.

It will be appreciated that the above embodiments are described only by way of example.

For instance, the diagnostic data is not limited to the examples given above but could comprise any data relating to the establishment of the session with the wireless access point. Further, the invention is not limited to any one particular access mechanism, e.g. it is not limited to DNS tunnelling but could instead be used in relation to other tunnelling protocol for bypassing restrictions of wireless access points, and it is not limited to the SSID or token exchange of FIGS. 4A and 4B. Further, the invention is not limited to any particular login or billing mechanism. Further, the invention is not limited to any particular encryption standard, protocol or message format.

Where it is referred to a server herein, this need not necessarily limit to a single sever unit but could instead refer to a distributed arrangement of such units. Further, the invention is not limited to the particular access node 107 comprising the described access point 108 and hotspot portal 109, but could more generally apply to any wireless access node.

In some embodiments, the function of accessing the wireless access node to set up a session could at least in part be implemented in a separate access manager application provided by an aggregator. An aggregator is a type of communication service provider who acts as middle party between hot spot providers and communication providers such as VoIP providers. The aggregator need not themselves directly provide communication services to end-users, but rather maintains arrangements with multiple hot-spot providers and with one or more other communication providers such as VoIP providers, and may present a common or standardised payment protocol for use by the VoIP client or similar. Thus the VoIP client can more readily access the hot-spots of multiple different hot-spot providers without the VoIP provider having to maintain direct relationships with each. In such a case, in one particularly preferred alternative embodiment, the functionality of reporting on failed sessions could be implemented in the aggregator's access manager application instead of the VoIP provider's client application, and the information on the failed session could be reported to a server operated by the aggregator. Generally speaking, either the VoIP client application or the aggregator's access manager application, or indeed potentially another type of application, could be considered a communication-related application for use in setting up the communications via the packet-based network, and either could be used to report on failed sessions. That is, the communication-related application that reports on the failure need not necessarily be the application that actually sets up the connection itself, but as in the example of an aggregator's access manager could more generally be an application for use as part of the overall process of setting up a connection. Also, note that an access manager could either report diagnostic data to one of its own servers or to a server that is associated with it in some other sense, e.g. an access manager could report to a server of a client provider with which the aggregator has an arrangement. Nonetheless, whether the reporting is implemented in the client or access manager, the hotspot or access node provider is still distinguished from the providers of the client or access manager in that the former is the provider of the actual hotspots or access nodes themselves whereas the latter are providers of software involved in some way in setting-up communications using those hotspots or access nodes.

In other embodiments, the function of accessing the wireless access node to set up a session and/or the function of reporting on failed sessions could even be provided by other means such as one or more dedicated hardware units and/or firmware embedded in the user terminal.

Further, the invention can apply to other systems than P2P systems and other packet-based networks than the Internet. The invention is preferably used to set up bidirectional communication connections such as voice calls, video calls or IM chat sessions, but can also be used to set up other communication connections such as file transfers. Other applications and configurations may of the present invention be apparent to the person skilled in the art given the disclosure herein. The scope of the invention is not limited by the described embodiments, but only by the appended claims.

The invention claimed is:

1. A communication system comprising:
one or more wireless access nodes of a first communication service provider and at least one server associated with a second communication service provider, interconnected via a packet-based network; and
a wireless user terminal operable to establish a session with one of the wireless access nodes of the first communication service provider, the wireless user terminal comprising a processor and a storage medium installed with an application of the second communication service provider, wherein said application is configured so as when executed on the processor to:
in event of failure to establish a session via one of the wireless access nodes of the first communication service provider, store information regarding the failed session at the wireless user terminal; and
in event of subsequent access to the packet-based network, transmit said information regarding the failed session to the server associated with the second communication service provider over the packet-based network.

2. The communication system of claim 1, wherein the server is arranged so as to enable a property of the communication system to be modified based on said information regarding the failed session received at the server.

3. The communication system of claim 1, comprising a plurality of said access nodes.

4. The communication system of claim 3, wherein said server of the second communication service provider is arranged to record an availability status for each of said wireless access nodes of the first communication service provider, the availability status indicating whether the respective access node is available to the client for setting up the communication connection.

5. The communication system of claim 2 wherein said server is arranged to modify the status of the access node to indicate it is not available based on said information regarding the failed session received at the server.

6. The communication system of claim 1, wherein an access page is made available to the user terminal from a server which is accessible even if access to packet-based network is not available.

7. The communication system of claim 2, wherein the server is arranged to modify the access page based on said information regarding the failed session received at the server.

8. The communication system of claim 2, wherein the server is arranged to modify message routing information used by the access node to establish the session, based on said information regarding the failed session received at the server.

9. The communication system of claim 2, wherein the server is arranged to modify, based on said information regarding the failed session received at the server, a format of at least one of a username and password in a message sent from the access node requesting establishment of the session.

10. The communication system of claim 1, wherein the server is arranged to communicate information about the failure to an operator of the access node based on said information regarding the failed session received at the server.

11. The communication system of claim 1, wherein the user terminal is arranged to initiate establishment of said session with the access node using a tunnelling protocol for bypassing restrictions of the access node.

12. The communication system of claim 11, wherein the failure is due to failure of the access node to recognise the tunnelling protocol.

13. The communication system of claim 1, wherein the failure is due to failure of the access node to respond with an expected response message according to a login protocol for establishing the session with the access node.

14. The communication system of claim 1, wherein the failure is due to failure of the server to respond or access node to relay an expected security token.

15. The communication system of claim 1, wherein said wireless access nodes are WLAN access nodes.

16. The communication system of claim 1, wherein said packet-based network is the Internet.

17. The communication system of claim 1, wherein the communication system is a peer-to-peer communication system.

18. The communication system of claim 1, wherein said application of the second communication service provider is a communication-related application for use in setting-up a communication connection with another user equipment over the packet-based network.

19. The communication system of claim 18, wherein the communication connection is a bidirectional communication connection.

20. The communication system of claim 1, wherein said application comprises a communication client of the second communication service provider, wherein the communication client is configured so as when executed on the processor to use said session to set up a communication connection with another user equipment over the packet-based network.

21. The communication system of claim 1, wherein said application comprises an access-manager of the second communication service provider, wherein the access manager is configured so as when executed on the processor to enable a client application of a third communication service provider to use said session to set up a communication connection.

22. A method for use in a communication system comprising one or more wireless access nodes of a first communication service provider and at least one server associated with a second communication service provider, interconnected via a packet-based network, wherein the method comprises:
attempting to establish a session between a wireless user terminal and one of the wireless access nodes of the first communication service provider, the wireless user terminal being installed with an application of the second communication service provider; and
following failure to establish the session between the wireless user terminal and the wireless access node of the first communication service provider, and in event of subsequent access to the packet-based network by the wireless user terminal, receiving information regarding the failed session at said server over the packet-based network, the information having been stored at the wireless user terminal by said application in response to said failure.

23. The method of claim 22, comprising modifying a property of the communication system based on said information regarding the failed session received at the server.

24. The method of claim 23, wherein said modification comprises recording an availability status for each of said wireless access nodes of the first communication service provider, the availability status indicating whether the respective access node is available to the client for setting up the communication connection.

25. The method of claim 23 wherein said modification comprises modifying the status of the access node to indicate it is not available based on said information regarding the failed session received at the server.

26. The method of claim 22, comprising making an access page available to the user terminal from a server accessible even if access to packet-based network is not available.

27. The method of claim 23, wherein said modification comprises modifying the access page based on said information regarding the failed session received at the server.

28. The method of claim 23, wherein said modification comprises modifying message routing information used by the access node to establish the session, based on said information regarding the failed session received at the server.

29. The method of claim 23, wherein said modification comprises modifying, based on said information regarding the failed session received at the server, a format of at least one of a username and password in a message sent from the access node requesting establishment of the session.

30. The method of claim 22, comprising communicating information about the failure from said server to an operator of the access node based on said information received regarding the failed session at the server.

31. The method of claim 22, wherein the failure is due to failure of the access node to recognise a tunnelling protocol used by the wireless user terminal o initiate establishment of said session with the access node.

32. The method of claim 22, wherein the failure is due to failure of the access node to respond with an expected response message according to a login protocol for establishing the session with the access node.

33. The method of claim 22, wherein the failure is due to failure of the server to respond or access node to relay an expected security token.

34. A method for use in a communication system comprising one or more wireless access nodes of a first communication service provider and at least one server associated with a second communication service provider, interconnected via a packet-based network, wherein the method comprises:
operating a wireless user terminal to attempt to establish a session with one of the wireless access nodes of the first communication service provider, the wireless user terminal comprising a processor and a storage medium installed with an application of the second communication service provider;
in event of failure to establish said session, using said application to store information regarding the failed session at the wireless user terminal; and
in event of subsequent access to the packet-based network, using said application to transmit said information regarding the failed session to the server associated with the second communication service provider over the packet-based network.

35. The method of claim 34, wherein the attempt to establish said session with the access node is by use of a tunnelling protocol for bypassing restrictions of the access node.

36. The method of claim 35, wherein the failure is due to failure of the access node to recognise the tunnelling protocol.

37. The method of claim 34, wherein the failure is due to failure of the access node to respond with an expected response message according to a login protocol for establishing the session with the access node.

38. The method of claim 34, wherein the failure is due to failure of the server to respond or access node to relay an expected security token.

39. The method of claim 22, wherein said wireless access nodes are WLAN access nodes.

40. The method of claim 22, wherein said packet-based network is the Internet.

41. The method of claim 22, wherein the communication system is a peer-to-peer communication system.

42. The method of claim 22, wherein said application of the second communication service provider is a communication-related application for use in setting-up a communication connection with another user equipment over the packet-based network.

43. The method of claim 42, wherein said communication connection is a bidirectional communication connection.

44. The method of claim 22, wherein said application comprises a communication client of the second communication service provider, wherein the communication client is configured so as when executed on the processor to use said session to set up a communication connection with another user equipment over the packet-based network.

45. The method of claim 22, wherein said application comprises an access-manager of the second communication service provider, wherein the access manager is configured so as when executed on the processor to enable a client application of a third communication service provider to use said session to set up a communication connection.

46. A computer program product for use in relation to a communication system comprising one or more wireless access nodes of a first communication service provider and at least one server associated with a second communication service provider, interconnected via a packet-based network, the computer program product comprises a non-transitory computer-readable medium storing thereon program codes so as when executed on a wireless user terminal to perform the steps of:
- operating the wireless user terminal to attempt to establish a session with one of the wireless access nodes of the first communication service provider;
- in event of failure to establish said session, store information regarding the failed session at the wireless user terminal; and
- in event of subsequent access to the packet-based network, transmit said information regarding the failed session to the server associated with the second communication service provider over the packet-based network.

* * * * *

UNITED STATES PATENT AND TRADEMARK OFFICE
CERTIFICATE OF CORRECTION

PATENT NO. : 8,130,635 B2
APPLICATION NO. : 12/584998
DATED : March 6, 2012
INVENTOR(S) : Mikael Suvi, Madis Kaal and Karlheinz Wurm It is certified that error appears in the above-identified patent and that said Letters Patent is hereby corrected as shown below:

In Column 20, line 15, delete "received" after "information";
In Column 20, line 16, insert --received-- after "session".

Signed and Sealed this
Eighth Day of May, 2012

David J. Kappos
*Director of the United States Patent and Trademark Office*